United States Patent Office 3,483,081
Patented Dec. 9, 1969

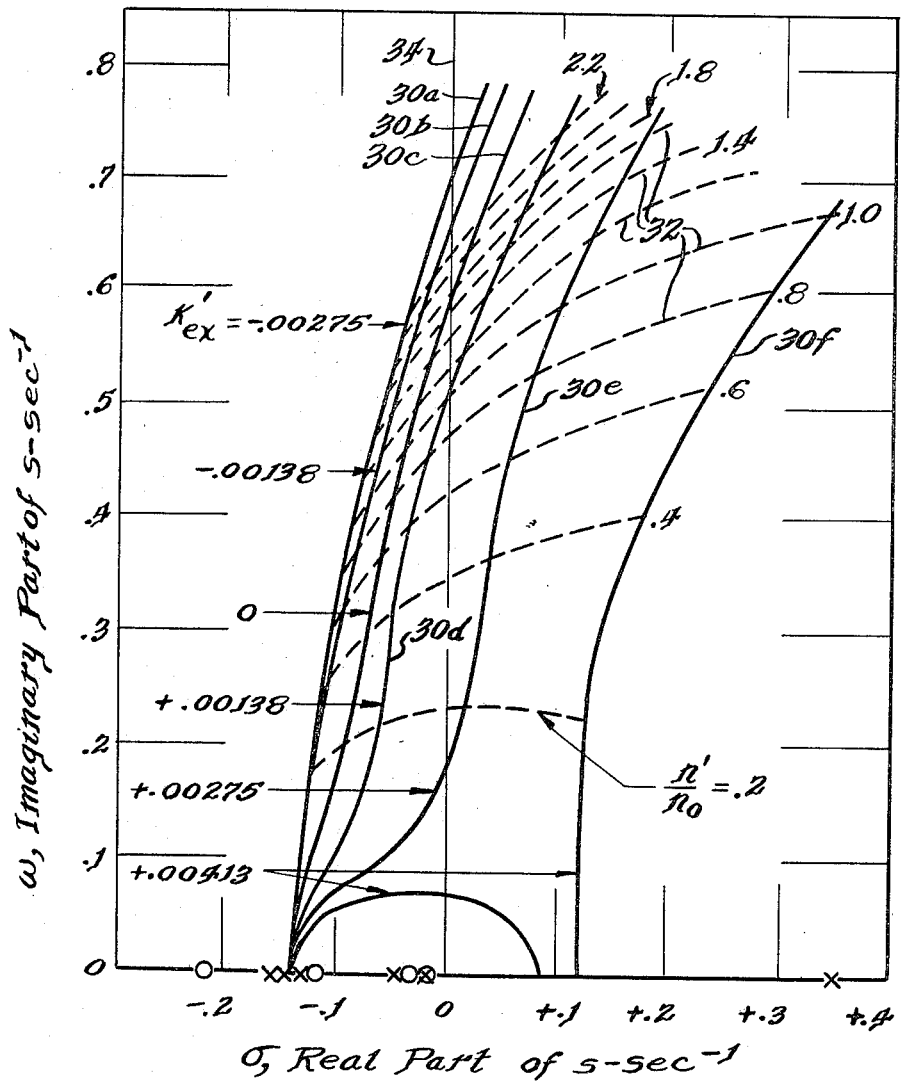

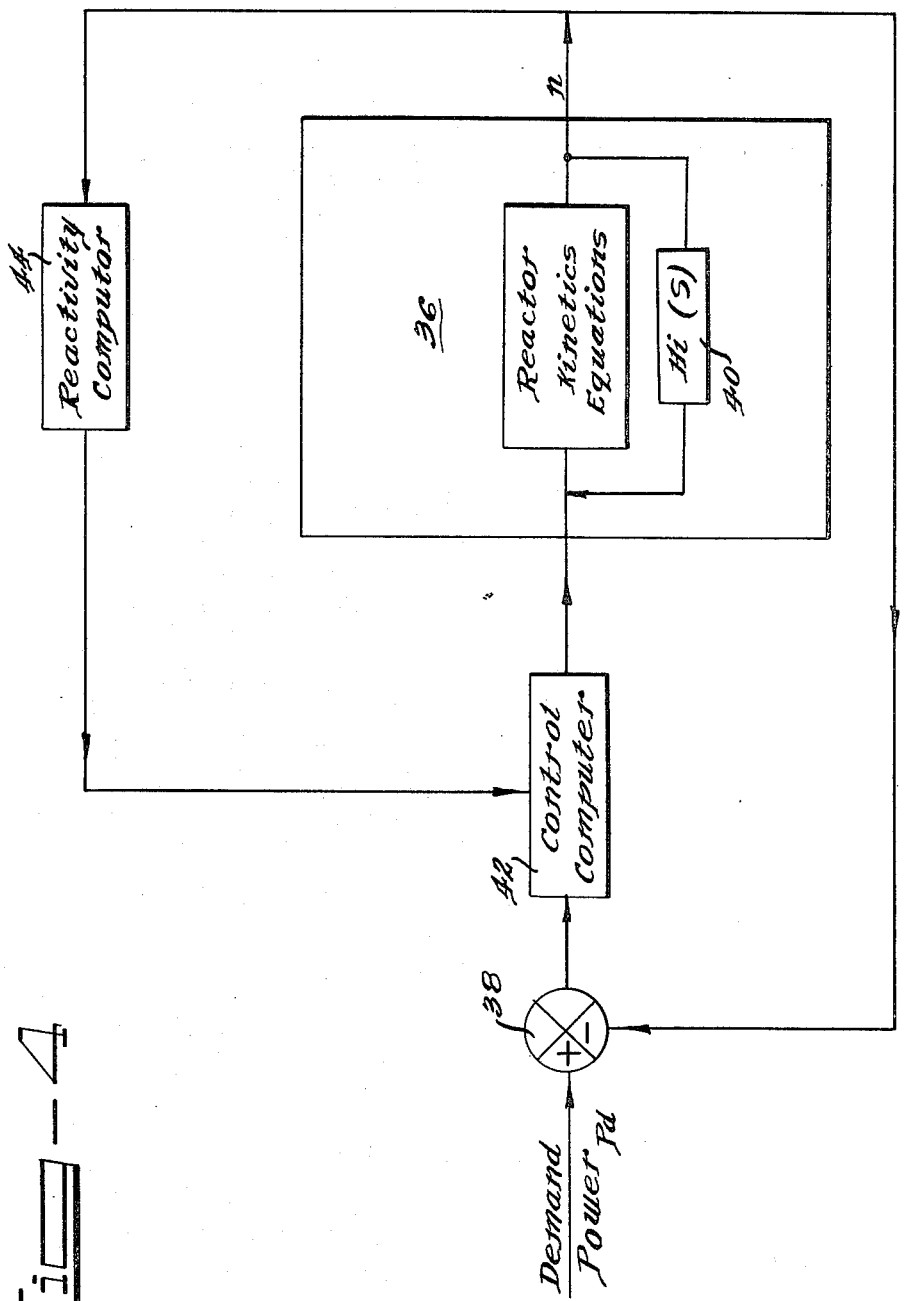

3,483,081
STABILITY IMPROVEMENT FOR NUCLEAR REACTOR AUTOMATIC CONTROL SYSTEM
David W. Sparks, La Grange, and Jack H. Tessier, Ingleside, Ill., assignors to the United States of America as represented by the United States Atomic Energy Commission
Filed May 21, 1963, Ser. No. 282,181
Int. Cl. G21c 7/00
U.S. Cl. 176—20          4 Claims

ABSTRACT OF THE DISCLOSURE

In a reactor servo control method wherein an instantaneous physical measure of the difference between a desired function of power level and the same function of the actual measured power level is obtained and applied as an error signal to control element motive means to cause the control elements to move at a velocity corresponding to the magnitude and sense of the error signal, the error signal is multiplied before application to the control element motive means by a factor $[\beta - k_{ex}(1-\beta)]$ where $\beta$ is the delayed neutron fraction and $k_{ex}$ is the excess multiplication factor, whereby the stability of the control system is improved.

CONTRACTUAL ORIGIN OF THE INVENTION

The invention described herein was made in the course of, or under, a contract with the United States Atomic Energy Commission.

This invention relates to automatic nuclear reactor control systems and more particularly to a method for providing improved stability thereof.

Reactor control systems utilize a measurement of output power of the reactor which is fed back and subtracted from the power demand of the reactor, the difference therebetween providing an error signal whereby the reactivity of the reactor is controlled. Present methods of control require that the reactor be operated on a long period to permit reactor power level changes to be made safely. When following a rapidly changing demand power, the period of the reactor is shortened, and the danger increases of the reactor control system becoming unstable whereby the neutron density may increase so rapidly that damage or destruction of the reactor occurs before the control system can rectify the situation. Thus, to remain within the capabilities of present reactor control systems, variations in demand power are restricted to periods in the minute range so that safe control may be maintained over the reactor during power level changes thereof without the reactor becoming unstable and thus inadvertently reaching prompt critical. As the reactor approaches a constant final demand power, the period becomes longer until when final demand power is attained the period theoretically becomes infinitely long, so that the effective neutron multiplication factor is equal to one.

Present methods of control are obviously undesirable where it is necessary that the reactor be brought to final demand power within a matter of seconds or a few minutes. Such a requirement exists in space reactors where for example cooling may be effected by hydrogen and it is necesary that the reactor be brought to final demand power as soon as possible so that the weight of the hydrogen be kept at a minimum. Further, though there is no present necessity to bring land based reactors up to final demand power within a short time duration, it is certainly desirable to have the capability of doing so in view of the many minutes or sometimes hours presently required.

Hurwitz, in U.S. Patent 2,931,761, teaches the derivation of a signal proportional to $$\frac{1}{1-k_p}$$

which in turn is a function of the prompt neutron multiplication factor in a reactor. Hurwitz teaches that this signal may be used as an indicator or as a safely limiter to stop the reactor from attaining prompt critical. However, he does not teach how this signal could be used to permit a reactor to be operated safely on short periods corresponding to neutron multiplication in the region of prompt critical when changing the power level thereof in conformance with a rapidly changing demand power input signal.

It is therefore one object of the present invention to provide a control method whereby reactor power level changes may be safely made on short periods.

It is another object of the present invention to provide a method for increasing the stability of conventional reactor control systems whereby the reactor may be safely brought to demand power in a short time duration.

It is another object of the present invention to provide a method whereby power level changes in a reactor may be made close to prompt critical.

It is another object of the present invention to provide a method whereby power level changes in a reactor may be made at rates requiring reactivity thereof at or above prompt critical.

Other objects of the present invention will become more apparent as the detailed description proceeds.

In general the present invention comprises multiplying the error signal derived from the hereinbefore described conventional control system by a factor $[\beta - k_{ex}(1-\beta)]$ wherein $\beta$ is the delayed neutron fraction and $k_{ex}$ is the excess multiplication factor and applying the resultant signal to control the reactivity of the reactor, or by otherwise operating upon the conventional error signal by a function of the factor $k_{ex}$.

Further understanding of the present invention may be obtained from consideration of the accompanying drawings in which:

FIGURE 3 is a root locus family plot for a typical reactor system.

FIGURE 4 is a block diagram of a general control system for the practice of the present invention.

The Incremental Linear Equivalent System (ILES) for a given nonlinear system is defined as a linear system whose time response is identical (in the limit of small $\Delta t$) to the response of the true nonlinear equations for the same initial conditions at the beginning of the interval $\Delta t$, and the same input disturbance during the interval.

The exact kinetic equations for a nuclear reactor are $$\frac{dn}{dt} = -\frac{\beta n}{l^*} + \frac{k_{ex}(1-\beta)n}{l^*} + \sum_{i=1}^{n} \lambda_i C_i \quad (1)$$

and $$\frac{dC_i}{dt} = \frac{\beta_i n}{l^*} + \frac{k_{ex}\beta_i n}{l^*} - \lambda_i C_i, \; i = 1 \rightarrow n \quad (2)$$

wherein:

$dn/dt$ = time rate of change of neutron density within the reactor
$\beta$ = delayed neutron fraction
$k_{ex}$ = excess neutron multiplication factor and is equal to $k_{eff}-1$ $n$ = neutron density
$1-\beta$ = prompt neutron fraction
$\lambda_i$ = $i$th delayed group decay constant
$C_i$ = concentration of precursors of the $i$th delayed neutron group
$dC_i/dt$ = time rate of change of the concentration of precursors of the $i$th delayed neutron group
$\beta_i$ = fraction of total neutrons generated which are in delayed neutron group $i$
$l^*$ = means neutron lifetime (secs.)

Derivation of the ILES for the above reactor kinetics equations is accomplished in the usual manner, by substitution of the following in the exact kinetics equations:

$$n = n' + \Delta n$$
$$C_i = C'_i + \Delta C_i$$
$$k_{ex} = k'_{ex} + \Delta k_{ex}$$

where:
$$\Delta n \ll n'$$
$$C_i \ll C'_i$$

$x'_i$ = constant at value of the corresponding variable at the beginning of interval $\Delta t$.

By dropping products of incremental quantities, a set of linear equations result which are dealt with using their Laplace transforms. The result of the derivation is an expression giving in implicit form the Laplace transform of the time variation of $\Delta n$ during the interval $\Delta t$:

$$\Delta n(s) = \left(s + \frac{\beta - k'_{ex}(1-\beta)}{l^*}\right)^{-1} \left[\Delta n(s) \sum_i \frac{\lambda_i \beta_i (1 + k'_{ex})}{l^*(s+\lambda_i)} + \Delta k_{ex}(s) \frac{n'}{l^*}\left(1 - \sum_i \frac{s\beta_i}{(s+\lambda_i)}\right) + \frac{n'}{l^*s}\left(k'_{ex} - \sum_i \frac{s\beta_i(1+k'_{ex})}{(s+\lambda_i)}\right) + \sum_i \frac{\lambda_i C'_i s}{(s+\lambda_i)}\right] \quad (3)$$

Figure 1:
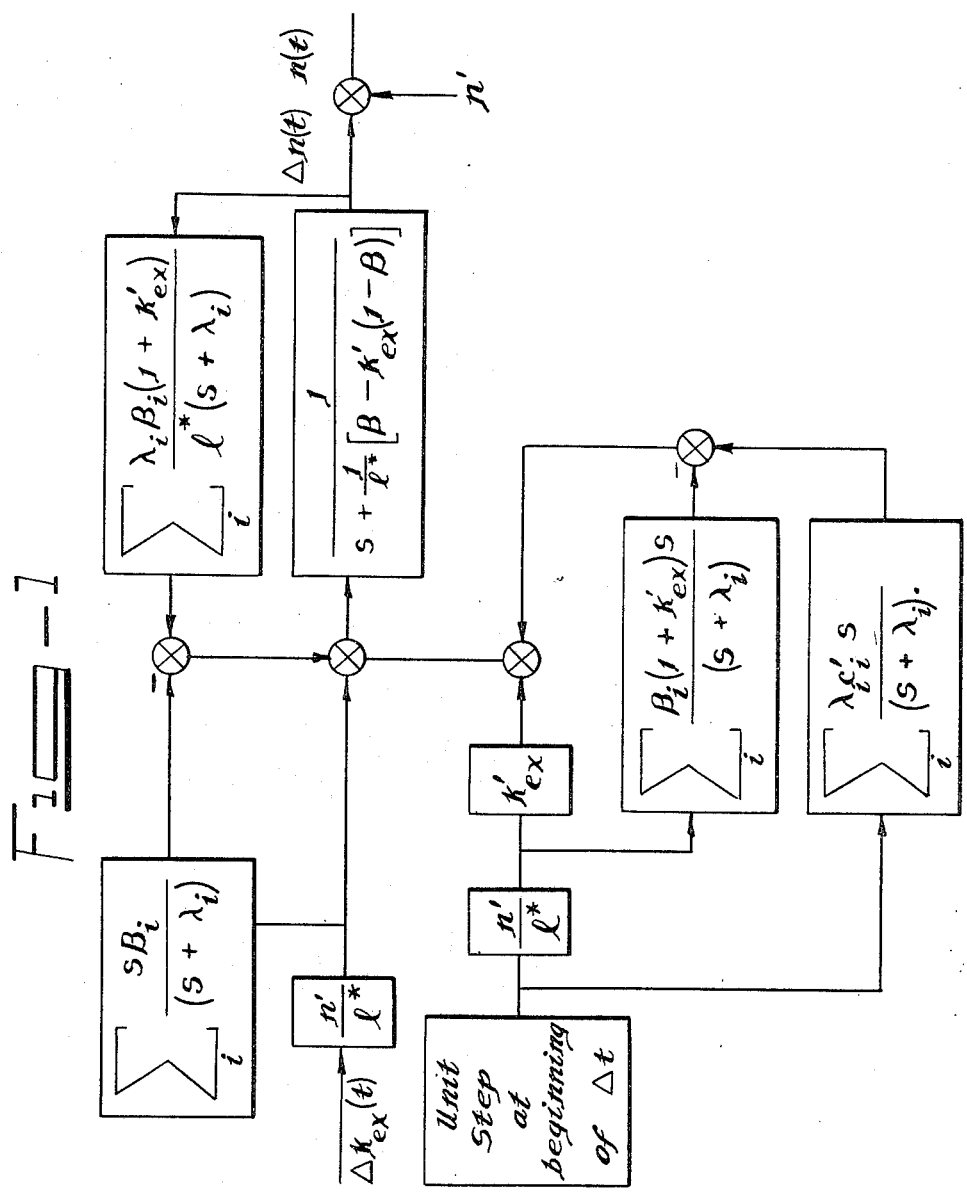
FIGURE 1 is the linear system block diagram equivalent of Equation 3 of the present disclosure.

FIGURE 1 is the linear system block diagram equivalent of Equation 3 for a nuclear reactor. FIGURE 1 is used to graphically facilitate understanding which of the elements of Equation 3 are responsible for the principal features of the response of the reactor.

From Equation 3 it is seen that $\Delta n(t)$ is given as the output of the linear system in FIGURE 1. It is to be noted that the system of FIGURE 1 has two inputs, one being a unit step function at the beginning of $\Delta t$ and the other the time variation of the actual $k_{ex}$ during the interval $\Delta t$. The unit step function input is modified by a sum of transfer functions whose values are determined by the initial conditions. The dynamic systems indicated by the transfer functions given in each block of FIGURE 1 are assumed to be in steady state with zero input at the beginning of $\Delta t$, i.e., at $\Delta t = 0-$. By the principle of superposition, which applies rigorously here since FIGURE 1 is a linear system, the total response $\Delta n(t)$ is given by the sum of the responses to each of the two inputs taken separately.

Thus it is seen that $\Delta n(t)$ consists of the sum of two sets of terms, each of which is the response of the system to one of the inputs with the other input assumed nonexistent. By definition, let:

$\Delta n_0(t)$ = sum of terms of response $\Delta n(t)$ due to initial condition input only,
$\Delta n_i(t)$ = sum of terms of response $\Delta n(t)$ due to $\Delta k_{ex}$ input only, hence $$\Delta n(t) = \Delta n_0(t) + \Delta n_i(t).$$

Considering the part of the response $\Delta n$ which is due to the input $\Delta k_{ex}$, the input-output relation is given by the transfer function:

$$\frac{\Delta n_i}{\Delta k_{ex}} = (n') \frac{1 - \sum_i \frac{s\beta_i}{s+\lambda_i}}{l^*s + (\beta - k'_{ex}(1-\beta)) - \sum_i \frac{\lambda_i \beta_i (1+k'_{ex})}{(s+\lambda_i)}}$$

Equation 4 is the exact form of the ILES transfer function relating a perturbation $\Delta k_{ex}$ to the resulting perturbation of $n$ from the function it would have followed due to initial conditions if $\Delta k_{ex}$ had remained zero.

Since superposition applies to the ILES, then regardless of whatever motions of $\Delta n$ are taking place due to the initial condition input, if the reactor is under closed loop control and the loop (closed through the $\Delta k_{ex}$ input) is unstable, diverging oscillations of $\Delta n_i$ superimposed on the initial condition motions will occur.

From FIGURE 1, it is apparent that for the range of frequency above which the gain of the feedback function has become negligible, the ILES transfer function becomes essentially equal to the forward transfer function shown, or $$\left.\frac{\Delta n_i / n'}{\Delta k_{ex}}\right]_w > 10 \cong \frac{1/l^*}{s + \frac{1}{l^*}(\beta - k'_{ex}(1-\beta))} \quad (5)$$

Thus, in this frequency range (in which the significant dynamics of many reactor control systems lies), the reactor is approximately represented by a first order system with a steady-state gain of $1/(\beta - k'_{ex}(1-\beta))$ and a corner frequency of $1/l^*(\beta - k'_{ex}(1-\beta))$. For fast reactor systems, hereby defined such that this corner frequency is well beyond the desired control system bandwidth for any desired period, the only nonlinearity needed in the compensation network will consist of a gain correction proportional to $(\beta - k'_{ex}(1-\beta))$ in series with the main control loop. Thermal reactor systems are hereby defined such that the corner frequency of Equation 5, which is a function of $k'_{ex}$, lies in the region of gain crossover of the control loop. For thermal reactors so defined, more complex nonlinear compensation may be needed therefor to counteract gain and corner frequency changes in the reactor transfer function which occur due to nonzero values of $k'_{ex}$, which changes are defined as the period effect.

Figure 2:
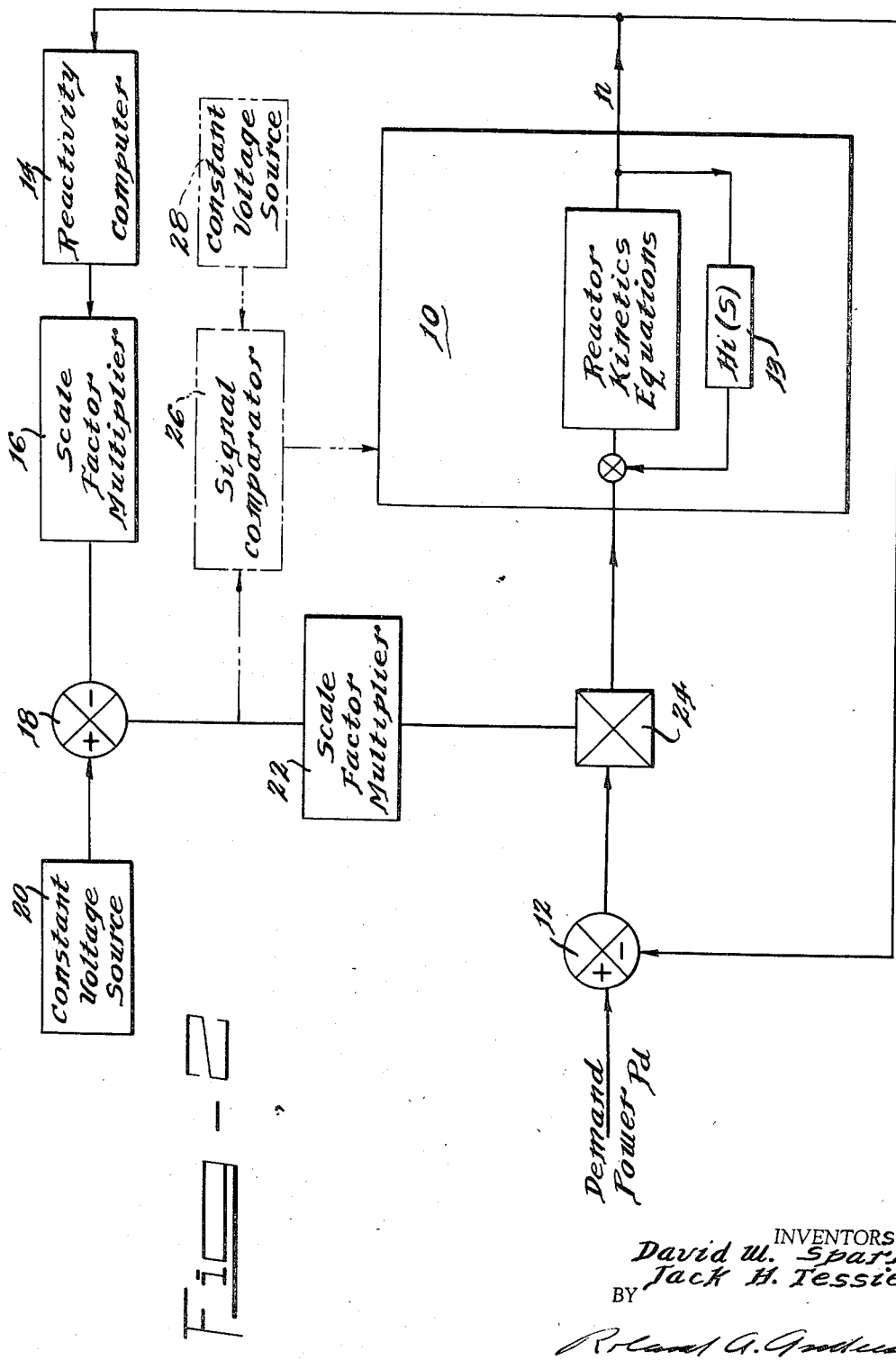
FIGURE 2 is a block diagram of a control system for the practice of the present invention.

In accordance with the teachings described supra, FIGURE 2 illustrates an embodiment of a reactor control system wherein a signal proportional to $[\beta - k_{ex}(1-\beta)]$ is used to improve stability thereof to permit operation in the region of prompt critical.

The main control loop of the reactor 10 comprises an ion chamber (not shown) which detects the neutron flux within the reactor. The output from the ion chamber is fed back to an error summing element 12 where it is subtracted from the programmed power demand ($P_d$) signal to give an error signal for any differences therebetween. This error signal in turn actuates a conventional servo control element drive mechanism (not shown) thereby causing the reactor control elements to be moved responsive thereto. The feedback element 13 designated as transfer function $H_1(s)$ is internal to the reactor and is inherently due to the thermal properties thereof. It is therefore not subject to control.

As hereinbefore mentioned, this main control loop is that which is conventionally used to control reactor power. Although such a conventional loop is stable when long periods are used for changes in reactor power level, it may become unstable when periods of seconds or less are used giving rise to the danger of destruction or damage to the reactor. By using a gain controlling feedback signal proportional to $[\beta - k_{ex}(1-\beta)]$, the main control loop may be stabilized to permit power level changes of the reactor on short periods of seconds or less.

The gain controlling feedback signal proportional to $[\beta - k_{ex}(1-\beta)]$ is generated in the following manner. The output from the ion chamber is fed to a reactivity computer 14. The computer 14 solves Equation 1, hereinbefore described, for the value of $k_{ex}$. The design and construction of the reactivity computer 14 is not shown in detail since it is well known in the art. Such design and construction is fully shown by G. S. Stubbs in his paper entitled Design and Use of the Reactivity Computer, IRE Transactions, Volume NS–4, Number 1, March 1957. The output signal from the computer 14 will therefore be proportional to $k_{ex}$. This output signal is fed to a conventional scale factor multiplier 16 where it is multiplied by the quantity $(1-\beta)$, the value of $(1-\beta)$ being a constant and known from the fuel in the reactor. The output from multiplier 16 is therefore proportional to $k_{ex}(1-\beta)$. This signal is then subtracted by a conventional summing element 18 from a signal proportional to $\beta$ obtained from a constant voltage source 20, the value of $\beta$ also being known from the fuel in the reactor. Thus, the output from summing element 18 is a signal which is proportional to $[\beta - k_{ex}(1-\beta)]$. The signal proportional to $$[\beta - k_{ex}(1-\beta)]$$

is then multiplied by a constant $1/\beta$ in a conventional scale factor multiplier 22, the value of $1/\beta$ being known from the fuel in the reactor 10.

The error signal of the main control loop is then multiplied by the signal $1/\beta[\beta - k_{ex}(1-\beta)]$ in a conventional analogue multiplier 24 to control the gain of the main control loop and hence compensate for the period effect.

Thus, as the rate of change of demand power goes up (i.e., requires a shorter period), $k_{ex}$ approaches prompt critical. The term $1/\beta[\beta - k_{ex}(1-\beta)]$ approaches zero and when multiplied with the error signal of the main control loop causes the sensitivity or gain of the control drive mechanism to go down counteracting the increased sensitivity of the reactor due to the period effect whereby stable control over the reactor is maintained. As the rate of change of demand power decreases, that is, the reactor approaches the desired power level, $k_{ex}$ approaches zero whereby the term $[\beta - k_{ex}(1-\beta)]$ approaches the value of $\beta$, and the term $1/\beta[\beta - k_{ex}(1-\beta)]$ approaches the value one. Thus, when $1/\beta[\beta - k_{ex}(1-\beta)]$ is multiplied by the error signal of the main control loop for the above described conditions, the sensitivity of the main control loop remains essentially constant at a value approximately equal to the normal sensitivity thereof.

It is thus seen that the value $[\beta - k_{ex}(1-\beta)]$ may be used in a fast reactor to stabilize the sensitivity of the main control loop thereof so that the reactor may be operated on fast periods (close to prompt critical) with the resulting ability to bring the reactor up to demand power in a short time duration while maintaining control thereover without the danger of causing instability in the main control loop.

It is desirable when using $[\beta - k_{ex}(1-\beta)]$ for the external gain correction that the gain of the main control loop be considerably greater than the internal feedback gain $H_i(s)$. Thus, the main control loop response characteristics are not greatly influenced by the relatively unknown internal feedback.

If one is designing a complete over-all control system as opposed to simply modifying an existing one, it would not be necessary for the practice of the present invention that the value $1/\beta$ be inserted in the gain controlling feedback signal. The value thereof may be absorbed in the design criteria of the main control loop whereby the feedback loop gain control will vary from slightly above zero to a value equal to $\beta$.

As recited supra the embodiment of FIGURE 2 illustrates the use of $[\beta - k_{ex}(1-\beta)]$ to improve the stability of a conventional reactor main control loop for operation in the region of prompt critical. The signal proportional to $[\beta - k_{ex}(1-\beta)]$ controls the gain or sensitivity of the main control loop so that it remains essentially constant irrespective of the value of the uncompensated error signal, and when the reactivity approaches prompt critical the value of $[\beta - k_{ex}(1-\beta)]$ approaches zero. If the value of $[\beta - k_{ex}(1-\beta)]$ is permitted to become zero or negative (the reactivity of the reactor being at prompt critical or greater) then control of the reactor would be lost. Further for fast reactor systems, the corner frequency of Equation 5 approaches zero as $[\beta - k_{ex}(1-\beta)]$ approaches zero. This introduces phase shift which will not be compensated for in the embodiment of FIGURE 2.

Accordingly, a scram safety circuit, which operates in response to the signal $[\beta - k_{ex}(1-\beta)]$ but is otherwise conventional, should be used to insure that prompt criticality is not attained. Such a circuit is shown in phantom in FIGURE 2 and comprises a conventional signal comparator 26 having two inputs. One input is taken from the output of summing element 18 and is proportional to $[\beta - k_{ex}(1-\beta)]$. The other input is derived from a constant voltage source 28 and is proportional to a predetermined fraction of $\beta$, e.g., 1% of $\beta$. As long as $[\beta - k_{ex}(1-\beta)]$ stays above the fractional $\beta$ signal there is no output from the comparator 26. When $[\beta - k_{ex}(1-\beta)]$ equals or becomes less than the fractional $\beta$ signal an output will ensue from comparator 26 which is fed to a conventional scramming mechanism (not shown) causing scram elements to shut down the reactor 10.

Thus, the embodiment of FIGURE 2 illustrates a control system for a fast reactor system whereby a feedback signal proportional to $[\beta - k_{ex}(1-\beta)]$ is used to improve the stability of the main control loop thereof such that operation in changing demand power may be accomplished in shorter periods than heretofore possible with the reactivity of the reactor being able to approach prompt critical closer than heretofore possible.

It should be noted that the feedback signal proportional to $[\beta - k_{ex}(1-\beta)]$ may be used in the above manner to compensate thermal reactor main control loops as hereinbefore defined; however, it is to be remembered that more complex nonlinear compensation may be needed to compensate for the period effect thereof.

For thermal reactor systems as hereinbefore defined, the corner frequency of Equation 5, which is a function of $k'_{ex}$, will lie in the region of gain crossover of the main control loop and hence more complex nonlinear compensation is need therefor to counteract the gain and corner frequency changes in the reactor transfer function which are the period effect. The theory and an embodiment will now be described for effecting such nonlinear compensation for the period effect, which compensation is most easily understood in terms of the motion of the poles of the reactor main control loop due to $k'_{ex}$.

The ILES transfer function of a reactor (Equation 4) may be further expressed to a close approximation in the following form:

$$\frac{\Delta n_i}{\Delta k_{ex}} = \frac{n'(1-\beta)}{l^*} \frac{\prod_{i=1}^{6}(s+\lambda_i)}{\prod_{i=1}^{7}(s-p_i)} \quad (6)$$

In Equation 6 the $\lambda$'s are the well known delayed neutron precursor decay constants and the $p$'s are the poles thereof. The values of the poles are functions only of $k'_{ex}$. It is to be noted that $n'$ appears in Equation 6 only as a gain constant.

It is thus seen that root locus family may be computed for the main control loop of any reactor system if linearized functions are assumed for each of the feedback components thereof. Each member of the family is a normal root locus plot for a given value of $k'_{ex}$. The poles move along the loci in the usual manner as determined by the gain constant which is proportional to $n'$.

Such a root locus family is shown in FIGURE 3 for a typical uncompensated reactor main control loop. Each solid line 30a, b, c, d, e, f is a branch of the standard root locus plot which shows the motion of the dominant poles of the uncompensated main control loop at a different particular value of $k'_{ex}$, e.g., line 30a is the plot therefor at a value of of $k'_{ex}$ equal to —.00275. The dotted lines 32 connect points of equal power output from the reactor on each of the root locus plots. The value shown for each dotted line is equal to $n'/n_0$, $n'$ being the instantaneous neutron density and $n_0$ the value chosen for normalizing neutron density.

Further understanding of the desired nonlinear compensation may be obtained by analyzing one of the root locus plots with respect to the operation of the uncompensated main control system of the reactor. The representative plot to be followed is line 30e calculated for a value of $k'_{ex}$ equal to .00275.

As the reactor builds up from zero power, assuming a constant period resulting from $k'_{ex}$ of .00275, the dominant poles of the main control loop leave the real axis and move up along line 30e. As the poles cross the imaginary axis 34, the probability of unstable oscillation is greatly enhanced. Thus, as the poles cross the imaginary axis 34 and enter the right half of the s-plane, the main control loop of the reactor commences to oscillate about the stable period corresponding to $k'_{ex}$. Accordingly, it is desirable that the line 30e never crosses the imaginary axis 34 whereby stable control of the main control system may be maintained. Though the foregoing example was given for particular root locus plot 30e, corresponding to a value of $k'_{ex}$ equal to .00275, it is to be understood that it is equally applicable to all other root locus plots in the family. Further, though FIGURE 3 is shown for the root locus plots for values of $k'_{ex}$ below prompt critical, it is to be understood that such root locus plots can be made for values of $k'_{ex}$ equal to and exceeding prompt critical.

A compensation differential equation for each root locus plot of the uncompensated main control loop of the reactor at a particular value of $k'_{ex}$ may be calculated according to conventional techniques as taught by John G. Truxal in Automatic Feedback Control System Synthesis, McGraw Hill, 1955. The compensation differential equations interject new poles and zeros in the transfer function of the main control loop whereby each root locus plot thereof is compensated so that it does not cross the imaginary axis 34 of FIGURE 3 for any values of $k'_{ex}$ and output power below specific arbitrarily chosen maximum values.

These individual compensation differential equations may be combined by conventional mathematical techniques to give a single compensation differential equation which reduces to the individual compensation differential equation required by each value of $k'_{ex}$ when its parameters are given specific values. This single compensation differential equation may be programmed on an analogue or digital computer using conventional components and techniques. The programming, using known techniques, is such that the parameters of the single compensation differential equation may be automatically and continuously adjusted in accordance with changing values of $k'_{ex}$, whereby the control loop's poles are prevented from entering the right half of the s-plane.

Turning now to FIGURE 4, an embodiment is shown which, using the above described principles, is capable of giving stable reactor control for operation below, at, or above prompt critical.

The main control loop of the reactor 36 comprises an ion chamber (not shown) which detects the neutron flux within the reactor. The output from the ion chamber is fed back to an error summing element 38 where it is subtracted from the programmed power demand ($P_d$) signal to give an error signal for any difference therebetween. This error signal in turn activates the control drive mechanism (not shown) thereby causing the reactor control elements to bemoved responsive thereto. The feedback element 40 designated as $H_i(s)$ is internal to the reactor 36 and is inherently due to the thermal properties thereof. It is therefore not subject to control. It is thus apparent that the main control loop for reactor 36 is the same as in FIGURE 2 and is the conventional control system of a reactor.

To effect nonlinear compensation for the main control loop of reactor 36 a control computer 42 is inserted between the error output of element 38 and the control drive mechanism of the reactor, the output of element 38 being one input to the computer 42 and the output of the computer being fed to the control drive mechanism. The output from the ion chamber within reactor 36 in also fed to a reactivity computer 44 of the type shown in FIGURE 2. The computer 44 continuously computes the value $k_{ex}$ as hereinbefore described for FIGURE 2. The output of computer 44 is then fed to an input of control computer 42.

The control computer 42, an analogue or digital computer using conventional components, is programmed using conventional programming techniques so that responsive to the $k_{ex}$ input the particular parameters associated therewith are inserted into the single compensation differential equation to reduce it to a particular compensation differential equation which operates on the error signal to interject new poles and zeros into the main control loop as hereinbefore described so that for $k_{ex}$ and output power within chosen limits the particular root locus plot thereof does not cross the imaginary axis 34 into the right half of the s-plane and stability is maintained in the main control loop. Thus, the error signal output from element 38 is compensated responsive to particular values of $k_{ex}$ so that the root locus family plots of the main control loop do not cross the imaginary axis and stable control is maintained thereover.

Since, as hereinbefore shown, compensation may be effected for root locus family plots corresponding to values of $k_{ex}$ equal to or above prompt critical, stable control may therefore be effected below, at, or above prompt critical, the only limitation thereon being the speed of response of the control drive mechanism to move the control elements. However, for the majority of reactors this limitation does not become a problem until very short periods in the millisecond region are used. At such very short periods, $k_{ex}$ is for most reactors well above prompt critical and the neutron multiplication is at such an excessive rate that the speed of response of the control drive mechanism becomes the limiting factor. As hereinbefore described for FIGURE 2 a simple safety scramming apparatus may be used responsive to a particular value of $k_{ex}$ above prompt critical for shutting down the reactor 36.

As for FIGURE 2, it is desirable that the gain of the main control system of reactor 36 be greater than the internal feedback gain $H_i(s)$ whereby the loop response characteristics are not greatly influenced by the relatively unknown internal feedback.

It is to be understood that though the embodiment of FIGURE 4 is primarily intended for effecting nonlinear compensation in thermal reactor control systems as hereinbefore defined, it is equally applicable to fast reactor systems as hereinbefore defined for operation below, equal to, or above prompt critical.

Since the reactivity computer of both FIGURES 2 and 4 is effectively a type of differentiator circuit, its output may contain noise having a level which is undesirable. This may be eliminated for both embodiments shown in FIGURES 2 and 4 by taking the input signal to the reactivity computer from demand power instead of measured power, the choice of so doing being dependent on the characteristics and requirements of the individual control system. The teachings and operation of the present invention remain the same regardless of which input is used.

It is further to be understood that the main control loops of the embodiments shown in FIGURES 2 and 4 need not be based on demand and measured power. They instead may be based on fluid pressure, thermal response, or any other reactor system variable or any particular dynamic function thereof, the principles of the present invention remaining the same therefor.

Persons skilled in the art will, of course, readily adapt the teachings of the present invention to methods far different than those illustrated. Accordingly, the scope of protection afforded the invention should not be limited to the methods shown in the drawings and described above.

The embodiments of the invention in which an exclusive property or privilege is claimed are defined as follows:

1. In a reactor servo control method wherein an instantaneous physical measure of the difference between a desired function of power level and the same function of the actual measured power level is obtained and applied as an error signal to control element motive means to cause the control elements to move at a velocity corresponding to the magnitude and sense of said error signal the improvement comprising determining from said actual measured power level a measure of the excess multiplication factor of said reactor and compensating said error signal before application to the control element motive means responsive to the excess multiplication factor of said reactor whereby the stability of the control system is improved.

2. In a reactor servo control method wherein an instantaneous physical measure of the difference between a desired function of power level and the same function of the actual measured power level is obtained and applied as an error signal to control element motive means to cause the control elements to move at a velocity corresponding to the magnitude and sense of said error signal, the improvement comprising determining from said actual measured power level a measure of the excess multiplication factor of said reactor and multiplying said error signal before application to the control element motive means by a signal derived from the excess multiplication factor of said reactor whereby the stability of the control system is improved.

3. The method of claim 2 wherein said derived signal is represented as $[\beta - k_{ex}(1-\beta)]$, $\beta$ being the delayed neutron fraction and $k_{ex}$ the excess multiplication factor.

4. The method of claim 2 herein said derived signal is represented as $1/\beta[\beta - k_{ex}(1-\beta)]$, $\beta$ being the delayed neutron fraction and $k_{ex}$ the excess multiplication factor.

References Cited

UNITED STATES PATENTS 3,079,315    2/1963    LeBaud et al. _____ 176—19

OTHER REFERENCES

Kovanits et al.: Automation of Nuclear Reactors Controls, October 1958, pp. 1297–1304.

Campbell: Control of Power Reactors–1; Nuclear Power, July 1960, pp. 68–72.

Cox: Control of Nuclear Reactors; Nuclear Power, July 1956, pp. 114–117, August 1956, pp. 161–164.

EUGENE G. BOTZ, Primary Examiner

U.S. Cl. X.R.

235—151, 182, 184